United States Patent
Kamijima (10) Patent No.: US 8,817,327 B2
(45) Date of Patent: Aug. 26, 2014

(54) PRINTING SYSTEM AND CORRESPONDENCE RELATIONSHIP INFORMATION CREATION METHOD TO MATCH VISUAL CHARACTERISTICS OF DIFFERENT PRINTERS

(75) Inventor: Masayuki Kamijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 13/295,959

(22) Filed: Nov. 14, 2011

(65) Prior Publication Data

US 2012/0120425 A1     May 17, 2012

(30) Foreign Application Priority Data

Nov. 15, 2010    (JP) ................................ 2010-254593

(51) Int. Cl.
    *G06K 1/00*        (2006.01)
    *G06K 15/02*      (2006.01)
    *H04N 1/024*     (2006.01)
    *G06K 9/34*        (2006.01)

(52) U.S. Cl.
    CPC .............. *G06K 15/02* (2013.01); *G06K 15/186* (2013.01)
    USPC ............. 358/1.9; 358/1.2; 358/3.06; 358/3.1; 358/3.3; 347/19; 347/184; 382/175

(58) Field of Classification Search
    None
    See application file for complete search history.

(56) References Cited

U.S. PATENT DOCUMENTS

| | | | |
|---|---|---|---|
| 6,704,123 B1 * | 3/2004 | Av-Shalom et al. | 358/2.99 |
| 6,717,700 B1 * | 4/2004 | Sanderson et al. | 358/3.21 |
| 6,717,770 B1 * | 4/2004 | Crawford | 360/123.11 |
| 6,967,747 B2 | 11/2005 | Housel | |
| 7,032,989 B2 * | 4/2006 | Nishikawa | 347/19 |
| 7,661,787 B2 * | 2/2010 | Hoshiyama et al. | 347/19 |
| 7,862,140 B2 * | 1/2011 | Yoshida et al. | 347/19 |
| 8,284,448 B2 * | 10/2012 | Fujiwara et al. | 358/1.9 |
| 2002/0024680 A1 | 2/2002 | Mehigan | |
| 2006/0181561 A1 * | 8/2006 | Takahashi et al. | 347/14 |
| 2006/0262330 A1 * | 11/2006 | Koase | 358/1.2 |

FOREIGN PATENT DOCUMENTS

| | | |
|---|---|---|
| EP | 1239663 A1 | 9/2002 |
| EP | 2104330 A1 | 9/2009 |
| JP | 2002-077642 A | 3/2002 |
| JP | 3770581 B2 | 4/2006 |
| JP | 2010-091590 A | 4/2010 |
| WO | 9320648 A1 | 10/1993 |

OTHER PUBLICATIONS

Extended European Search Report for European Application No. EP11188794, mailed Jun. 10, 2014.

* cited by examiner

*Primary Examiner* — Steven Kau (74) *Attorney, Agent, or Firm* — Maschoff Brennan (57) ABSTRACT

A printing system includes a first unit that obtains a rendering command specifying a combination of at least a thickness and a color of a line; a second unit that converts the rendering command into a converted rendering command by converting the combination specified in the rendering command so that an average darkness of a result of printing the line matches a desired average darkness of a result of printing the line using a target printer; a third unit that generates image data including the rendered line based on the converted rendering command; and a printing unit that executes printing based on the image data.

6 Claims, 8 Drawing Sheets

PRINTING SYSTEM AND CORRESPONDENCE RELATIONSHIP INFORMATION CREATION METHOD TO MATCH VISUAL CHARACTERISTICS OF DIFFERENT PRINTERS

BACKGROUND

This application claims priority to Japanese Patent Application No. 2010-254593, filed Nov. 15, 2010, the entirety of which is incorporated herein by reference.

1. Technical Field

The present invention relates to printing systems that print images specified by rendering commands, and to correspondence relationship information creation methods for converting rendering commands.

2. Related Art

Thus far, systems that obtain a rendering command from CAD application software, generate bitmap data containing lines rendered in accordance with the rendering command, and form an image based on the bitmap data on a print medium have been known.

Japanese Patent No. 3770581 discloses preventing problems such as the disappearance of fine line image areas from within an image in a color image is printed in black and white using a low-resolution printer, by using both or either one of a halftone dot process and an error diffusion process in accordance with the characteristics of the line-shaped portions in the image (that is, the thickness, the darkness, and so on). JP-A-2010-91590, meanwhile, discloses a method related to barcode printing, where a barcode that can be read in a stable manner by a barcode reader is printed by correcting black line thicknesses that fluctuate due to a variety of causes, such as the environment (temperature, humidity, and so on), the passage of time, and so on. To create a reference for the correction of line thicknesses, a reference pattern that contains a plurality of black lines of the same thickness is printed, the darkness of the reference pattern is detected by a sensor, and the reference for the black line thickness of the barcode is determined based on the darkness signal. This technique discloses correcting the thicknesses of the black lines contained in the barcode to be printed based on the black line thicknesses of the reference that has been determined in this manner.

With the past techniques, there has been a problem in that in the case where diagrams created using CAD application software are printed on different printers, the visual thicknesses of the lines drawn in the diagrams have varied depending on the printer, which has led to the diagrams being mistakenly read. Depending on the resolution of the printer, restrictions unique to the printing process (bleeding, widening), and so on, it may not be possible to faithfully reproduce the line thicknesses specified in the rendering command. Furthermore, there are cases where the darkness of the printed materials differs from printer to printer even if a color of the same darkness is specified in the rendering command. Accordingly, variations such as those mentioned above have occurred in the case where the same diagram is printed using different printers. In JP-A-2010-91590, the black line thicknesses have been corrected by changing the size of the dots that configure the edges of the black lines in the thickness direction, changing the number of dots in the black lines in the thickness direction, and so on. However, it is difficult to cause microscopic line thicknesses to match across different printers (this is because it is not possible to adjust the position of a dot to a finer degree than the resolution of the printer, and there are typically only approximately three types of dot sizes, or large, medium, and small; in addition, the sizes of dots can also differ depending on the type of the printer). Furthermore, even if the microscopic line thicknesses could be caused to match, differences in the darkness of the recording agent itself used in the printers can arise depending on the type of the recording agent, and it is thus conceivable for the visual thickness of the lines to appear different to the human eye even if the microscopic line thicknesses match.

SUMMARY

An advantage of some aspects of the invention is to provide a printing system capable of causing the visual characteristics of lines contained in an image printed by a printer as a reference to match each other.

A printing system according to a first aspect of the invention obtains a rendering command for rendering a line and, before generating image data including the line specified in the rendering command and printing the image data using a printing unit, converts a combination of a thickness and a color specified in the rendering command so that an average darkness of a result of printing the line using the printing unit matches a desired average darkness of a result of printing the line using a target printer. Image data including the line specified in the converted rendering command is then generated, and the printing unit executes printing. Because there is a limit to the spatial frequencies that can be seen by the human eye, differences in the line thicknesses of lines that are so fine so as to exceed that limit are seen as differences in darkness. Accordingly, even if the line thicknesses are not caused to match at the microscopic level, causing the average darknesses to match makes it possible to cause the visual line thicknesses to match with the result of the printing carried out by the target printer. Furthermore, by converting the combination of the thickness and the color of the line rather than only the thickness of the line, it is possible to adjust the average darkness at a resolution that cannot be adjusted simply by converting the thickness of the line; this makes it possible to cause the visual line thicknesses to match with the result of the printing carried out by the target printer at a high level of accuracy. In other words, according to this aspect of the invention, in which the combination of the thickness and the color is converted, the density of the dots in the direction in which the line extends can be adjusted, in addition to adjusting the number of dots in the thickness direction of the line, adjusting the sizes of the dots that configure the edges of the line in the thickness direction, and so on; this makes it possible to increase the resolution at which the average darkness is adjusted. Note that the "line" in the invention may be a straight line or may be a curved line.

It is preferable that the first unit be any unit as long as the unit can obtain a rendering command for rendering a line as raster image data. For example, the first unit obtains a graphic file created using a CAD application program, and obtains the rendering command from that graphic file. Parameters specifying the thickness of the line, parameters specifying the color of the line, and so on are contained in the rendering command for rendering a line.

It is preferable that the second unit be any unit as long as the unit can convert the rendering command into the converted rendering command by converting the combination of the thickness and the color specified in the rendering command so that the average darkness of the result of printing the line using the printing unit matches the desired average darkness of the result of printing the line using the target printer. Here, "average darkness" refers to a darkness obtained by averaging a predetermined area, that includes the line, formed on a print medium. As a method for converting at least one of the thickness and the color, for example, a conversion formula may be defined, and the rendering command may then be converted by deriving the thickness, the color, and so on of the post-conversion line through calculations performed in accordance with the conversion formula. Alternatively, the pre-conversion rendering command and the post-conversion rendering command (that is, the converted rendering command) may be associated in advance, and the rendering command may then be converted using information indicating a correspondence relationship thereof. Further still, the thickness, color, and so on in the post-conversion rendering command may be derived by carrying out an interpolation process using information indicating a correspondence relationship created in advance.

It is preferable that the third unit be any unit as long as the unit can generate image data including the rendered line based on the converted rendering command. In other words, the unit may be any unit as long as the unit can render a line based on the converted rendering command for rendering the line and generate image data (raster image data) including that line. Also it is preferable that the printing unit be any unit as long as the unit can execute printing based on the image data generated by the third unit, and no particular limitation is placed on the printing method. The printing unit converts the aforementioned image data in accordance with the method used by the printing unit, printing conditions, and so on, and executes the printing by controlling a printing mechanism.

According to another aspect of the invention, it is preferable that, using information indicating a correspondence relationship between a first combination and a second combination in which the desired average darkness obtained by reading a result of the target printer printing a pattern image including a line specified by a combination that is the first combination matches the average darkness obtained by reading a result of the printing unit printing a pattern image including a line specified by a combination that is the second combination, the second unit convert the rendering command specifying the first combination into the converted rendering command specifying the second combination.

Furthermore, it is preferable that the pattern image be an image in which a plurality of lines are arranged with white space interposed between the lines. In this case, the average darkness and the desired average darkness be darknesses obtained by averaging a region that includes a plurality of lines and white space. Alternatively, the pattern image be an image configured of a single line and white space. In this case, the average darkness and the desired average darkness be darknesses derived based on a darkness distribution in the thickness direction of the line expressed at a resolution that is finer than the thickness of the line.

Furthermore, it is preferable that the correspondence relationship be defined for each type of print medium onto which the pattern image is printed by the target printer and the printing unit. In this case, it is preferable that the second unit convert the rendering command into the converted rendering command using information indicating the correspondence relationship based on the type of the print medium. Depending on the type of the print medium, the spreading nature of the recording agent, the color development, the color of the print medium itself, and so on differ. These differences affect the appearance of lines formed on the print medium. Therefore, if the rendering command can be converted based on the type of the print medium, the visual characteristics of the lines can be caused to match with an even higher level of accuracy.

Furthermore, it is preferable that the pattern image be printed for each slope or curvature factor of the line, and the correspondence relationship be defined for each slope or curvature factor of the line included in the pattern image. In this case, it is preferable that the second unit convert the rendering command into the converted rendering command. Depending on the printing mechanism, there are cases where the thicknesses of dots, which are the smallest unit of which an image is configured, differ depending on the direction, even if those dots are of the same size. For example, in ink jet serial printers, there are cases where the thickness of dots in the main scanning direction is greater than the thickness of dots in the sub scanning direction. Accordingly, even if the number of dots in the thickness direction of the line is the same, the thickness of the line can differ depending on the slope of the line (for example, a slope relative to the main scanning direction in the plane of the print medium). Accordingly, if the rendering command can be converted in accordance with the slope of a straight line, the curvature factor of a curved line, and so on, as is the case in this aspect of the invention, the visual characteristics of the lines can be caused to conform with an even greater degree of accuracy.

Furthermore, according to another aspect of the invention, it is preferable that the printing unit be configured of a serial printer, and a darkness sensor that measures the desired average darkness and the average darkness be provided in a carriage that includes a print head and moves back and forth in a main scanning direction. According to this aspect of the invention, the print head can form an image while moving back and forth along with the carriage, and the darkness sensor can be used in detecting skew in the landing positions of ink in the main scanning direction during bi-directional printing. The aforementioned average darkness can be measured using this darkness sensor, and in this case, costs can be reduced more than when providing a separate darkness sensor for measuring the average darkness.

Furthermore, the printing system according to the invention is not limited to a system that is realized as an independent apparatus, and therefore it is preferable that the various elements of the printing system according to the invention be provided in a plurality of apparatuses. For example, the printing system according to the invention may be realized by a computer that executes a printer driver and a printer. Furthermore, the invention can also be realized as a method for creating information indicating a correspondence relationship between an inputted rendering command and a converted rendering command in order to convert a rendering command, and as an apparatus thereof. The functions of the various units described in the aspects of the invention are realized as hardware resources in which the functions of the units themselves are specified, hardware resources whose functions are specified by programs, or as a combination of the two. In addition, the functions of these units are not intended to be limited to being realized by hardware resources that are physically independent from each other. Furthermore, the invention can also be realized as a recording medium on which is recorded a printing program. Of course, the recording medium for this computer program may be a magnetic recording medium, a magneto-optical recording medium, or any other type of recording medium that will be developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
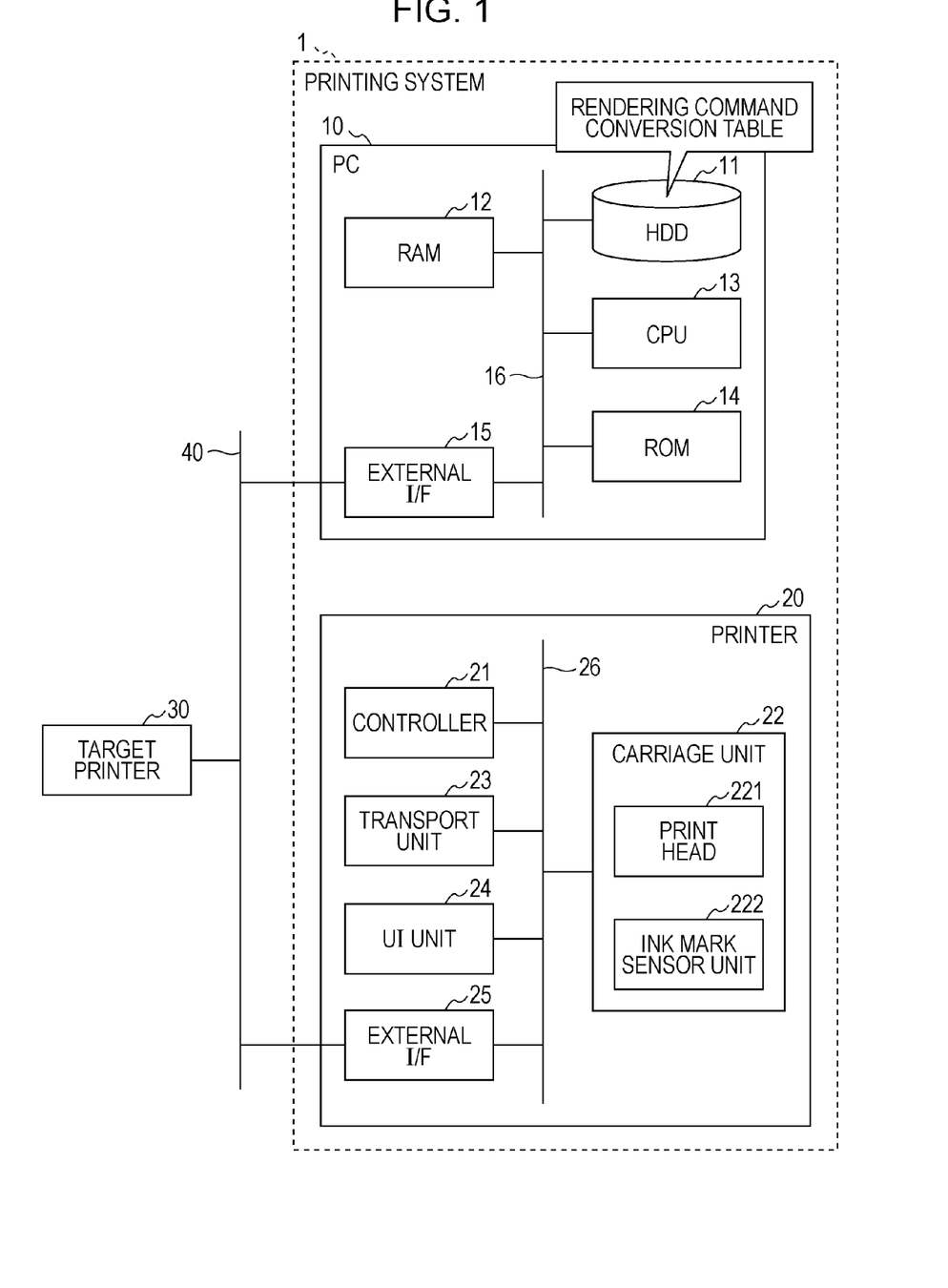
FIG. 1 is a block diagram illustrating the configuration of a printing system.

Embodiments of the invention will be described hereinafter according to the following order with reference to the appended drawings. Note that in the drawings, like constituent elements are given the same reference numerals, and redundant descriptions thereof are omitted.
(1) Printing System Configuration
(2) Definition Procedure for Correspondence Relationship
(3) Printing Control Process
(4) Variations
(1) Printing System Configuration FIG. 1 is a block diagram illustrating the configuration of a printing system according to an embodiment of the invention. As shown in FIG. 1, a printing system 1 according to this embodiment is configured of a PC (personal computer) 10 and a printer 20. The PC 10 includes: a hard disk drive (HDD) 11 that stores various types of computer programs such as an OS (operating system), a CAD application program, a raster image generation program, a printer driver program, and so on; a RAM 12 into which these computer programs are loaded; a CPU 13 that executes these computer programs; a ROM 14 that stores a boot program and the like; an external interface (I/F) 15 for connecting to an external device; and an internal I/F 16 for connecting these constituent elements to each other. The external I/F 15 connects to the printer 20 and a target printer 30 via a network 40 such as a LAN (local area network).

The printer 20 is an ink jet serial printer, and includes: a controller 21; a carriage unit 22; a transport unit 23; a UI (user interface) unit 24; an external I/F 25; and an internal I/F 26 for connecting these constituent elements to each other. The controller 21 includes an ASIC, a CPU, a ROM, and a RAM, none of which are shown. The ASIC and the CPU that executes programs stored in the ROM execute various types of computational processes for a printing control process, which will be described later. The "printing control process" is a process for forming a printed image upon a print medium by controlling the carriage unit 22, the transport unit 23, and so on.

The carriage unit 22 includes a print head 221 and an ink mark sensor unit 222, as well as a carriage motor, a carriage motor driver, ink cartridges, and so on, which are not shown. The carriage motor generates a driving force for driving the print head 221 in the main scanning direction. The carriage motor driver generates a driving signal needed to drive the carriage motor based on a control signal from the controller 21. The ink cartridges hold inks of the colors C (cyan), M (magenta), Y (yellow), and K (black) to be supplied to the print head 221. The print head 221 includes nozzles corresponding to the respective colors of ink, and ejects the ink supplied from the ink cartridge onto the print medium in accordance with control signals from the controller 21.

The ink mark sensor unit 222 includes an LED and a darkness sensor (not shown), and is mounted in the carriage. The LED irradiates the surface of the print medium with visible light, and the darkness sensor senses the light reflected by the print medium. The sensing target region is, for example, a square that is several mm in side length. The ink mark sensor unit 222 moves back and forth in the main scanning direction along with the carriage, and thus the sensing target region also moves in the main scanning direction based on the position of the carriage. The darkness sensor then outputs, to the controller 21, a signal indicating a darkness obtained by averaging the darknesses of the sensing target region.

The ink mark sensor unit 222 is a sensor provided in order to detect skew in the main scanning direction of the landing positions of ink when carrying out bi-directional printing, where printing is carried out both when the carriage is outbound and when the carriage is inbound. In this embodiment, the ink mark sensor unit 222 is used in order to detect the darkness of a pattern image, as will be described later. Using the existing ink mark sensor unit 222 contributes to cost reduction more than in the case where a darkness sensor is provided separately.

The transport unit 23 includes a transport motor, transport rollers, a motor driver, and so on, none of which are shown, and transports a recording medium in the sub scanning direction, which is orthogonal to the main scanning direction, based on a control signal from the controller 21. Through this, the print head 221 and the print medium can be moved relative to each other in the main scanning direction and the sub scanning direction, and thus a two-dimensional printed image can be formed by causing ink droplets to land in various positions upon the print medium. Note that in this embodiment, the ink mark sensor unit 222 and the print medium can move relative to each other in the main scanning direction and the sub scanning direction, and thus various positions on the print medium can be used as the aforementioned sensing target region.

The UI unit 24 includes a display unit that displays images and an operation unit that accepts operations. The UI unit 24 displays, in the display unit, a print settings screen for accepting settings for various printing conditions, based on a control signal for the controller 21. In addition, the UI unit 24 accepts settings for printing conditions regarding the print medium and so on through the operation unit, and outputs an operation signal indicating the content of the settings to the controller 21.

In this embodiment, the same file that contains rendering commands for lines is printed by the target printer 30 and the printer 20. The target printer 30 is positioned as a printer that prints a line that is to be caused to match with the visual characteristics of a line printed by the printer 20. The target printer 30 may be any printer that is capable of printing an image based on a graphic file created using a CAD application program, a pattern image file on which a pattern image for defining a correspondence relationship, mentioned later, is arranged, and so on. The target printer 30 need not be the same type of printer as the printer 20, and may be an ink jet printer, a laser printer, or any other type of printer.

(2) Definition Procedure for Correspondence Relationship

In this embodiment, in order to cause the lines printed by the target printer 30 to match with the visual characteristics of the lines printed by the printer 20 when printing the same graphic file using the target printer 30 and the printer 20, the rendering command for rendering lines contained in a graphic file is converted before printing that graphic file using the printer 20. Here, a procedure for defining a correspondence relationship referred to when converting the rendering command will be described. The correspondence relationship is defined in advance, before the graphic file is printed (that is, before the printing control process).

Figure 2:
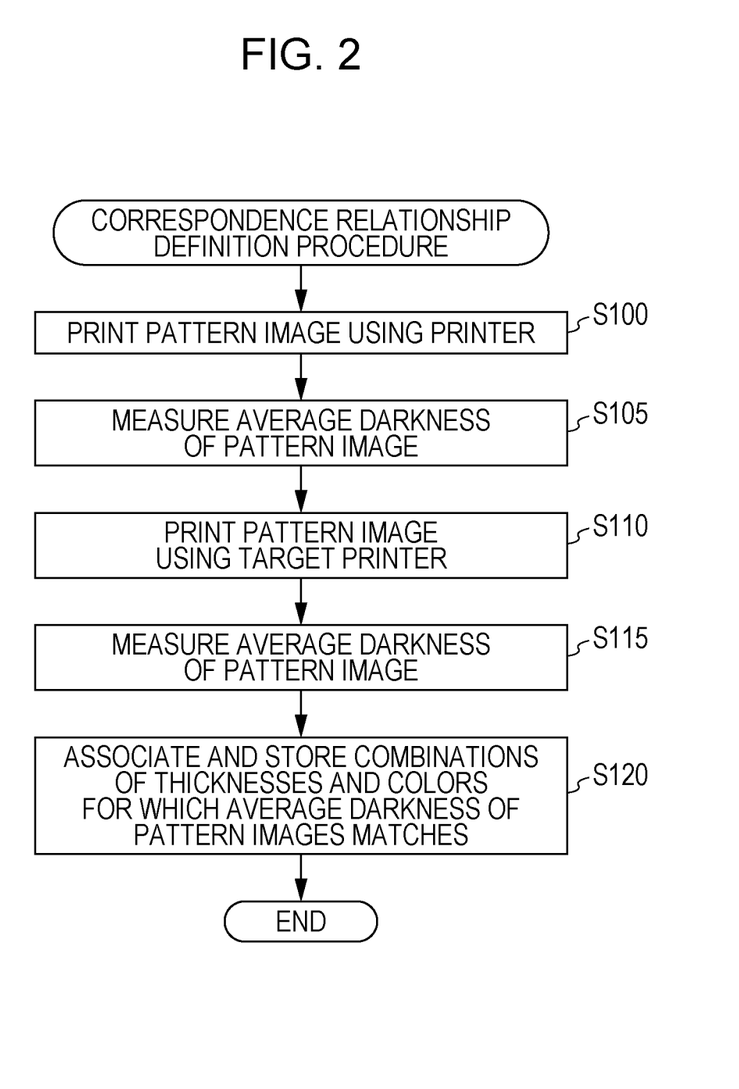
FIG. 2 is a flowchart illustrating a procedure for defining a correspondence relationship.

FIG. 2 is a flowchart illustrating a procedure for defining a correspondence relationship. First, the PC 10 causes the printer 20 to print a pattern image file containing rendering commands for rendering a plurality of pattern images, which will be mentioned later (step S100). The PC 10 generates raster image data based on the rendering commands contained in the pattern image file, other commands, and so on by executing the raster image generation program. Then, the PC 10 generates print data by carrying out a resolution conversion process, a color conversion process, a halftone process, and a rearranging process through the execution of the printer driver program of the printer 20, and then sends the generated print data to the printer 20. The controller 21 of the printer 20 then executes the print by controlling the various elements of the printer 20 based on the print data that has been sent. The controller 21 of the printer 20 causes the ink mark sensor unit 222 to measure an average darkness of each pattern image in synchronization with the back-and-forth movement of the carriage (step S105).

Figure 3:
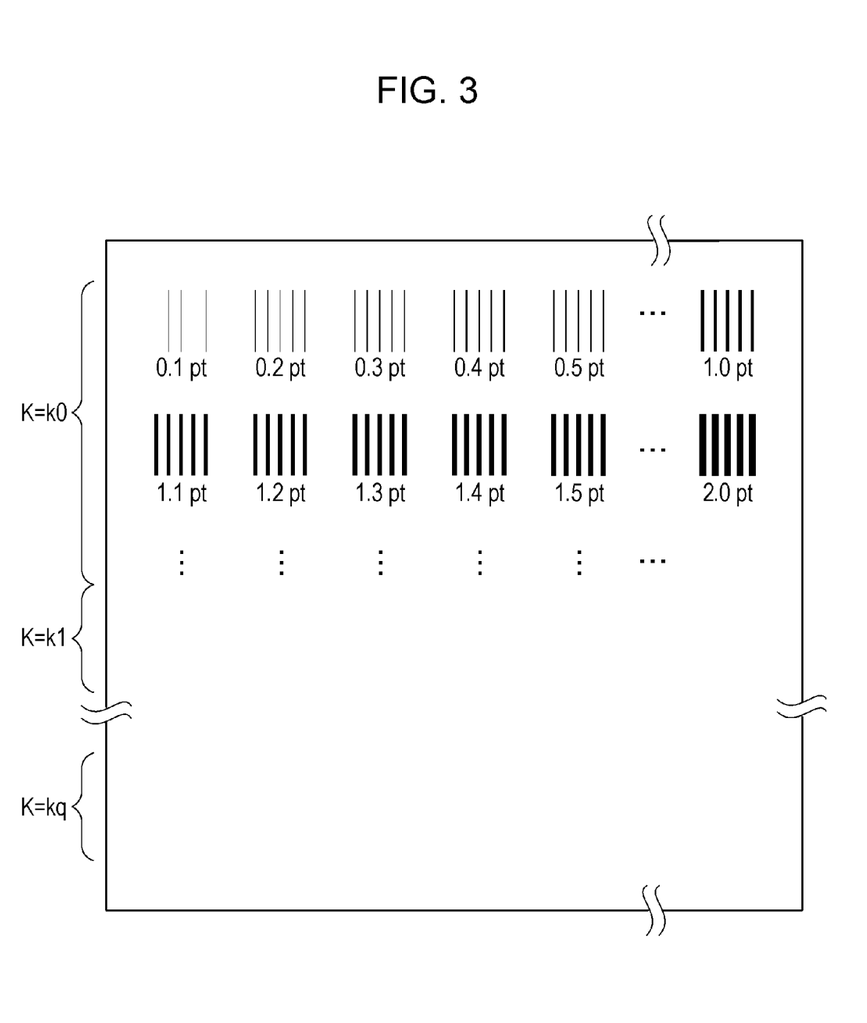
FIG. 3 is a schematic diagram illustrating pattern images.

FIG. 3 is a schematic diagram illustrating an example of a pattern image sheet on which a plurality of pattern images are arranged. Each pattern image is configured with a plurality of lines parallel to each other disposed at equal intervals with white space interposed therebetween. The region occupied by a single pattern image should at least be wider than the sensing target region. Furthermore, the lines should be disposed at intervals so that no less than two lines fall within the sensing target region. When a plurality of lines fall within the sensing target region, the influence of read errors can be reduced more than when only a single line falls within the sensing target region. Meanwhile, in this embodiment, the plurality of lines contained in each pattern image are straight lines that extend in the direction parallel to the sub scanning direction. The lines contained within a single pattern image have the same thickness and color. The thicknesses of the lines differ by, for example, 0.1 pts from pattern image to pattern image. p pattern images having lines of different thicknesses are taken as a single set, and q sets are prepared for each color, for a total of p×q pattern images. The descriptions in this embodiment are given assuming that the color of the lines specified in the rendering commands is a color expressed using only K ink. Accordingly, in the pattern image sheet, q sets of pattern images are prepared for each darkness of the K ink, with C=M=Y=0.

Next, the PC 10 causes the target printer 30 to print the same pattern image file as the pattern image file used in step S100 (step S110). The PC 10 generates raster image data based on the pattern image file by executing the raster image generation program, converts the raster image data into print data of a format suited to printing by the target printer 30 by executing the printer driver program of the target printer 30, and sends the print data to the target printer 30. The target printer 30 executes printing based on the print data that has been sent. Then, when a user sets the print medium on which the plurality of pattern images have been formed by the target printer 30 in a paper supply unit of the printer 20 and commences the reading thereof, the printer 20 measures the darknesses of the pattern images printed by the target printer 30 by controlling the transport unit 23, the carriage unit 22, and the ink mark sensor unit 222 (step S115).

As described earlier, the ink mark sensor unit 222 measures the darkness of a square region several mm in side length. Accordingly, a darkness found by averaging an overall region that contains lines and white spaces (referred to as an "average darkness") is what is measured in step S105 and step S115. The average darkness of the pattern image printed by the target printer 30 corresponds to a "desired average darkness".

Note that it does not matter whether the steps S100 to S105 or the steps S110 to S115 are executed first.

Next, the PC 10 stores combinations of line thicknesses and colors that result in an average darkness that matches the average darkness of the pattern image printed by the target printer 30 (the desired average darkness) in association with each other (step S120). Specifically, for example, the results of the measurement of the average darknesses carried out in step S105 and step S115 are sent to the PC 10, and the PC 10 carries out the association using the measurement results that have been sent.

Figure 4:
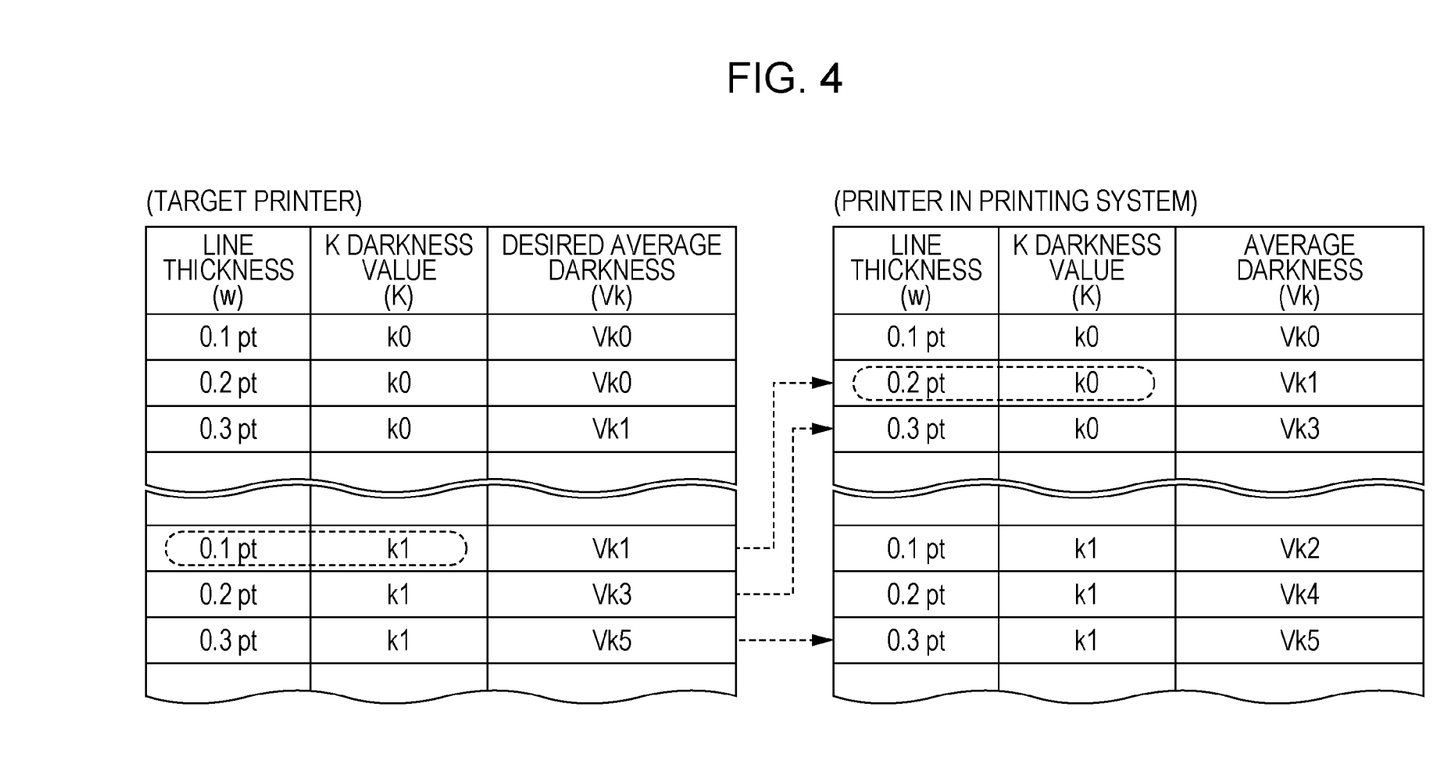
FIG. 4 is a schematic diagram illustrating a correspondence relationship.

FIG. 4 shows two tables illustrating relationships between "line thickness" and "K darkness value", and the average darkness of a pattern image that contains lines rendered according to the "line thickness" and "K darkness value". In FIG. 4, the left side is a table regarding the pattern images printed by the target printer 30, whereas the right side is a table regarding the pattern images printed by the printer 20. The printer 20 sends the information indicated in the two tables shown in FIG. 4 to the PC 10.

Figure 5:
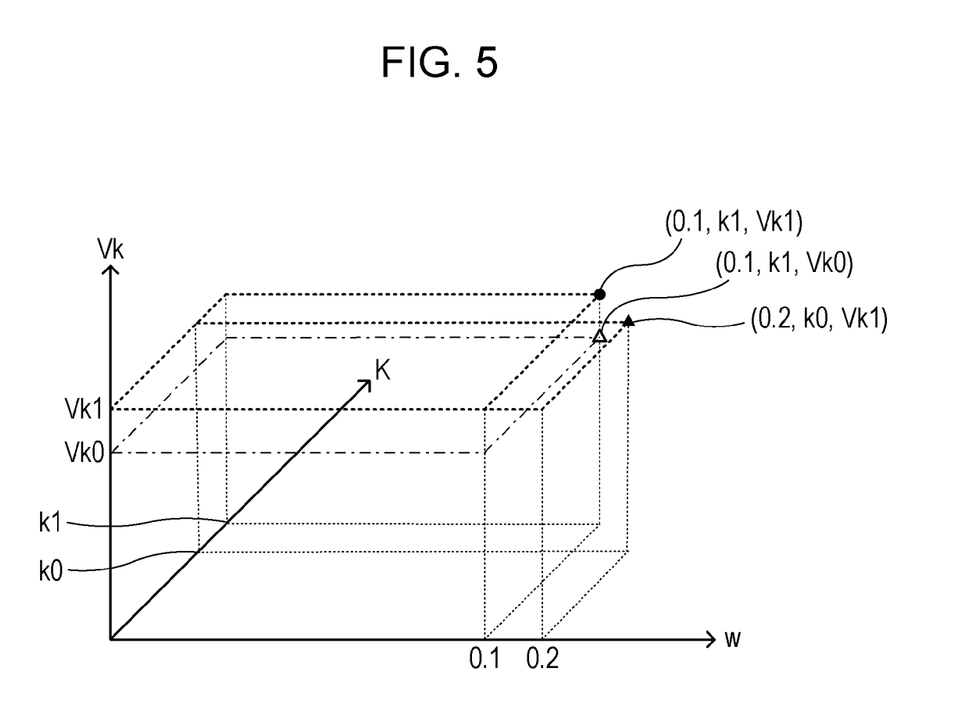
FIG. 5 is a graph illustrating a relationship between a line thickness, a color (darkness), and an average darkness of a pattern image.

FIG. 5 is a graph illustrating a relationship between the line thickness (the w axis), the K darkness value (the K axis), and the average darkness (the Vk axis). In the graph shown in FIG. 5, the w axis indicates a thicker line the further from the origin, the K axis indicates a darker darkness for K the further from the origin, and the Vk axis indicates a darker average darkness the further from the origin. In the examples indicated in FIG. 4 and FIG. 5, in the case where a pattern image in which lines corresponding to (w, K)=(0.1 pt, k1) are arranged at equal intervals with white space interposed therebetween has been printed by the target printer 30, the average darkness Vk thereof is Vk1, whereas in the case where the same pattern image, or in other words, a pattern image in which lines corresponding to (w, K)=(0.1 pt, k1) are arranged at equal intervals with white space interposed therebetween, has been printed by the printer 20, the average darkness Vk thereof is Vk0, in which the darkness of K is lighter than Vk1. In other words, even lines expressed by a rendering command specifying the same thickness, color, and so on exhibit visible differences in the darknesses thereof if the printers that print those lines are different.

In step S120, the PC 10 searches out, from the table of average darknesses of the pattern images printed by the printer 20, a combination of thickness and K darkness whose average darkness matches the average darkness of a pattern image containing lines of a thickness and a K darkness printed by the target printer 30, and associates these matching combinations with each other. For example, in the table on the right side in FIG. 4 (that is, the table in which examples of average darknesses are given for each pattern image printed by the printer 20), it can be seen that the combination of (w, K)=(0.2 pt, k0) has the average darkness of Vk1. In other words, in the case where lines rendered as a result of a rendering command specifying (w, K)=(0.1 pt, k1) have been printed by the target printer 30, the thickness and color parameters of the rendering commands may be converted to (w, K)=(0.2 pt, k0) in order to print lines whose darknesses visually match with the stated lines using the printer 20. Accordingly, in step S120, a rendering command conversion table, in which (0.1 pt, k1) serving as a combination of a thickness and a K darkness in the pre-conversion rendering command and (0.2 pt, k0) serving as a combination of a thickness and a K darkness in the post-conversion rendering command are associated with each other, is stored in the PC 10. Likewise, correspondence relationships between other combinations of thicknesses and colors for which the average darknesses match are stored as a rendering command conversion table in the HDD 11.

(3) Printing Control Process

Figure 6:
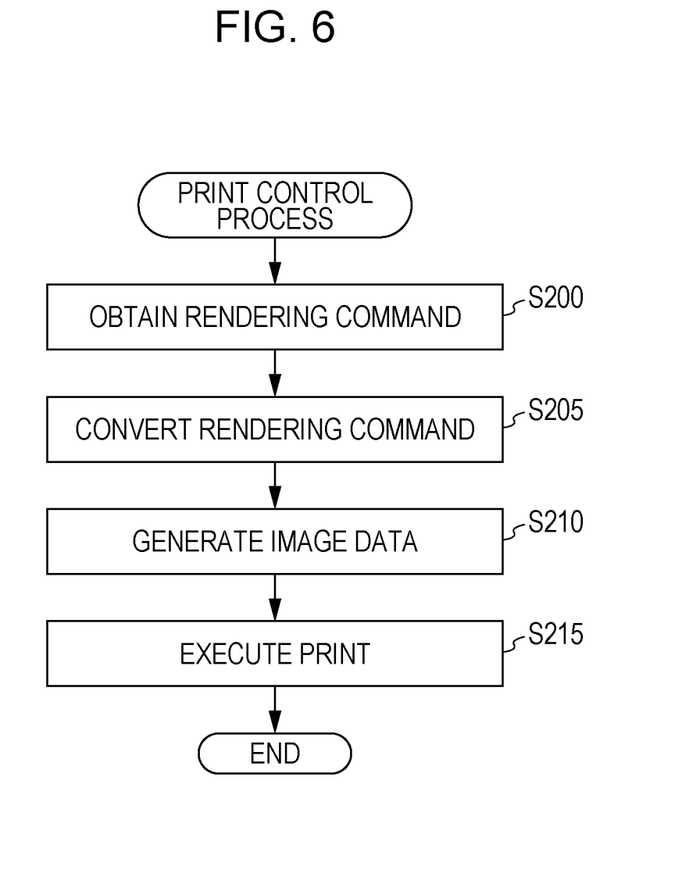
FIG. 6 is a flowchart illustrating a printing control process.

FIG. 6 is a flowchart illustrating the flow of a printing control process according to this embodiment. The process illustrated in FIG. 6 is a process executed when printing, using the printer 20, a graphic file created using the CAD application program. The printing is carried out so that the visual characteristics of the lines conform to the result of printing the graphic file using the target printer 30.

First, the PC 10 obtains a rendering command (step S200). To be more specific, the PC 10 obtains the graphic file to be printed, analyzes the various types of print commands contained in the graphic file, and obtains the rendering command for rendering lines. Next, the PC 10 converts the rendering command into a converted command by converting the thicknesses, colors, and so on specified in the rendering command for rendering the lines obtained in step S200 (step S205). In other words, in order to cause the visual thicknesses to conform to the lines contained in the same graphic file printed by the target printer 30, the PC 10 converts the rendering command for rendering the lines contained in the graphic file. Specifically, the PC 10 converts the rendering command by referring to the aforementioned rendering command conversion table. For example, in the case where the graphic file contains a rendering command for a line whose color is (0, 0, 0, k1) when a line of a thickness of 0.1 pt in the graphic file is converted into the CMYK color space, the thickness in that rendering command is converted to 0.2 pt, and the color is converted so that the color in the CMYK color space is (0, 0, 0, k0) (see FIG. 4 and FIG. 5). Although other parameters in addition to the thickness and color, such as the starting coordinates and ending coordinates of the line, may be specified in a rendering commands for a straight line, those other parameters are not converted, and the values thereof are held over.

Next, the PC 10 generates image data (raster image data) based on the graphic file containing the converted rendering command, by executing the raster image generation program (step S210). Then, the PC 10 and the printer 20 execute printing based on the image data. Specifically, the PC 10 carries out a resolution conversion process, a color conversion process, a halftone process, and a rearranging process in accordance with the printing conditions by executing the printer driver program of the printer 20, and converts the image data generated in step S210 into print data. The PC 10 then sequentially sends the print data to the printer 20. The printer 20 executes printing based on the print data that has been sent from the PC 10 (step S215). Accordingly, it is possible to cause the visual thicknesses of lines contained in a graphic to match the thickness when the graphic is printed by the target printer 30 with the thickness when the graphic is printed by the printer 20, which makes it possible to prevent erroneous readings of the graphic.

(4) Variations

Note that the technical scope of the invention is not intended to be limited to the aforementioned embodiment, and it goes without saying that various changes can be made within a scope that does not depart from the essential spirit of the invention. For example, the aforementioned embodiment describes measuring the average darkness using a pattern image in which lines that extend in the sub scanning direction are disposed at equal intervals. However, there is a tendency, in ink jet serial printers, for the shapes of the ink droplets that land upon the print medium to be longer in the main scanning direction, in which the carriage moves back and forth, than in the sub scanning direction. Accordingly, even if the thicknesses of straight lines as specified in a rendering command are the same, it is possible for the visual thicknesses of the straight lines to differ depending on the direction in which the lines extend. Therefore, if information indicating correspondence relationships, as described in the aforementioned embodiment, is created in advance according to the directions in which the lines specified in the rendering command extend, when printing a graphic file using the printer 20, the visual thicknesses of lines in printed material can be caused to conform to those of the target printer 30 with a greater degree of precision, in accordance with the direction in which the lines extend (that is, the slope) in the graphic file printed by the printer 20.

Figure 7A:
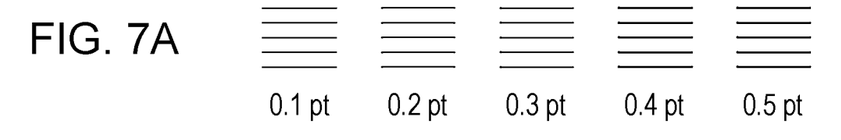
FIGS. 7A through 7D are schematic diagrams illustrating a variation on a pattern image.
Figure 7B:
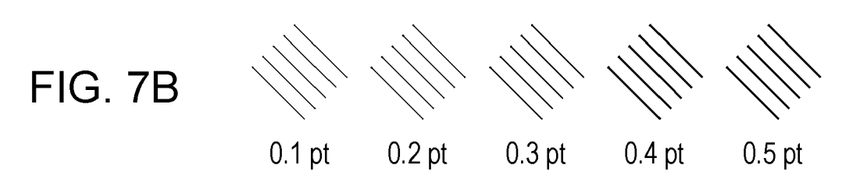
Figure 7C:
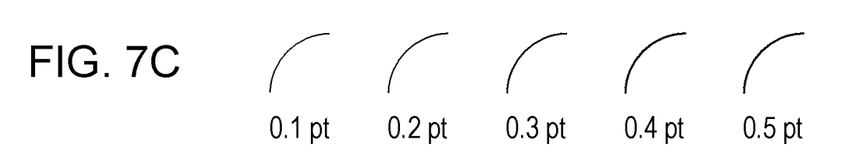
Figure 7D:
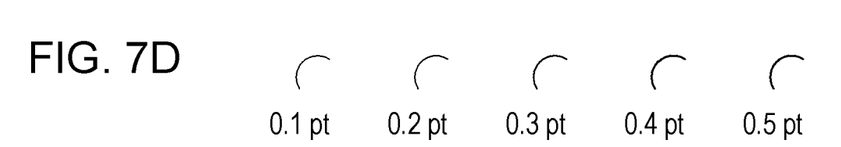

FIGS. 7A through 7D illustrate other working examples of pattern images. As shown in FIG. 7A and FIG. 7B, pattern images may be provided for each slope of the straight lines, and associations may then be carried out in the same manner as shown in FIG. 4. Meanwhile, as shown in FIG. 7C and FIG. 7D, pattern images may be provided for each curvature factor of curved lines, and associations may then be carried out in the same manner as shown in FIG. 4.

In addition, the aforementioned various pattern images may be printed for each type of print medium, and the associations may then be carried out as shown in FIG. 4 for each type of print medium. The rendering commands may then be converted based on information indicating correspondence relationships in accordance with the types of print media used when printing the graphic file.

Figure 8A:
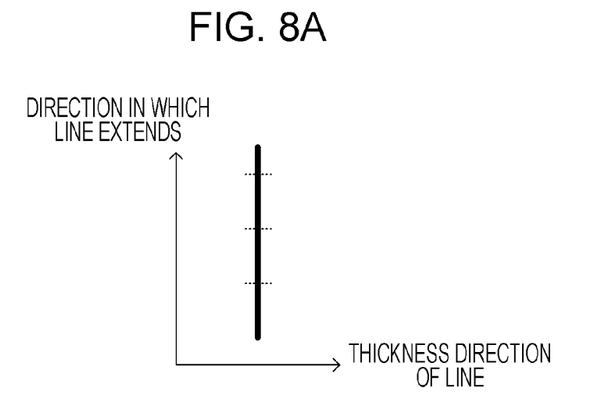
FIGS. 8A through 8C are schematic diagrams illustrating a darkness distribution in the thickness direction of a line.
Figure 8B:
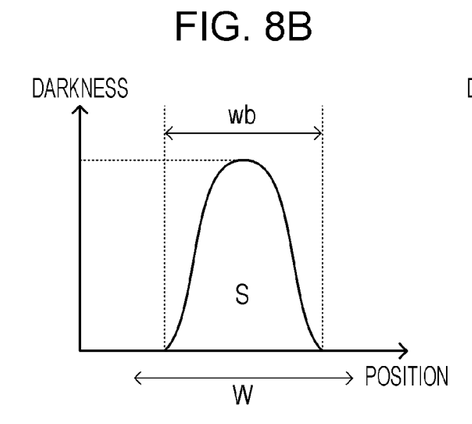
Figure 8C:
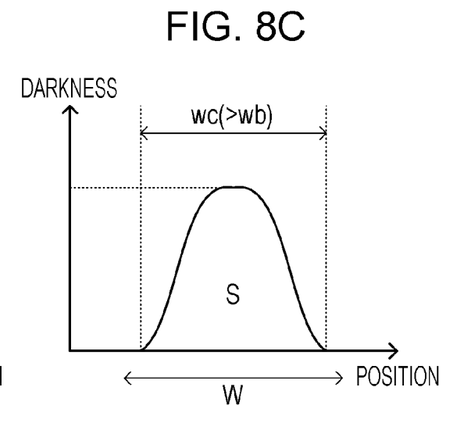

In addition, although the aforementioned embodiment describes a configuration in which a darkness sensor provided in the carriage reads a darkness that has been averaged across a square region several mm in side length, the configuration may be such that the darkness is read using a higher-resolution two-dimensional scanner and the darkness value is obtained from that scanner. In such a case, the average darkness obtained in step S105 and S115 in FIG. 2 may be an integrated value of the line darknesses based on a darkness distribution in the thickness direction of the lines (or may be a value in which the integrated value is divided by a constant thickness W). Then, in step S120, combinations of thicknesses and darknesses for which the average darknesses match may be associated with each other. To be more specific, for a single straight line formed on the print medium, the darknesses of the line in the thickness direction are obtained in a plurality of locations along the direction in which the line extends, as shown in FIG. 8A, and the darknesses of pixels whose positions in the thickness direction of the line are the same are averaged; when a darkness distribution is drawn for each position in the thickness direction of the line, the darkness is highest in the center of the line in the thickness direction, and gradually decreases toward the ends in the thickness direction of the line, as shown in FIG. 8B and FIG. 8C. This is because smaller dots are formed at the ends than at the center, the likelihood that dots are formed is lower, and so on. In this working example, the visual thicknesses of the lines are caused to conform by converting the thicknesses, colors and so on specified in the rendering command so that integrated values of the darknesses in each position in the thickness direction of which the line is configured (this corresponds to an area S in FIGS. 8B and 8C) match.

Furthermore, although the aforementioned embodiment describes an example in which the rendering command is converted for lines of a color expressed using only K ink, the same can be carried out for colors expressed solely by each of the other colors of ink. In addition, rendering commands can be converted in the same manner for lines of a color expressed by a plurality of ink colors by using pattern images corresponding to that color. Although the thicknesses and the K darknesses are associated with average darknesses in the tables illustrated in FIG. 4, a table in which "line thickness", "C darkness value", "M darkness value", "Y darkness value", and "K darkness value" are associated with "brightness", "saturation", and "hue" obtained by reading the result of printing pattern images containing lines in which those thicknesses and CMYK values are specified may be created in order to cause the color of a pattern image containing lines in which a color expressed by a plurality of ink colors is specified to match with more accuracy. Combinations of line thicknesses and CMYK values in which the "brightness", "saturation", and "hue" match may then be associated with each other and stored.

Although the aforementioned embodiment describes a configuration in which the PC 10 analyzes the rendering command and generates raster image data by executing the raster image generation program, converts the data into print data, and sends the print data to the printer 20, it should be noted that the configuration may be such that the printer 20 is provided with a raster image generation program, a raster image generation circuit, or the like, and the printer 20 obtains the graphic file, analyzes the rendering command, and executes the processes starting with the generation of the raster image data.

Note also that any printer that can print the same graphic files as the printer 20 may be employed as the target printer 30, and the target printer 30 does not necessarily need to be connected to the PC 10, as in the aforementioned embodiment. Accordingly, the target printer 30 may, for example, be a printer that is controlled by a PC aside from the PC 10.

What is claimed is:

1. A printing system comprising:
   a first unit that obtains a rendering command specifying a combination of at least a thickness and a color of a line;
   a second unit that converts the rendering command into a converted rendering command by converting the combination specified in the rendering command so that an average darkness of a result of printing the line matches a desired average darkness of a result of printing the line using a target printer;
   a third unit that generates image data including the rendered line based on the converted rendering command; and
   a printing unit that executes printing based on the image data,
   wherein a pattern image is printed by the printing unit which indicates a plurality of average darkness values as a combination of each of a plurality of different thickness and colors of a plurality of lines, the pattern image being used to establish a correspondence between the plurality of average darkness values of the printing unit with a plurality of target average darkness values of a target printer, and wherein the second unit converts the rendering command specifying the combination into the converted rendering command;
   wherein the pattern image is printed by the target unit to obtain the plurality of target average darkness values as a combination of a plurality of different target thickness and target colors of a plurality of lines.

2. The printing system according to claim 1,
   wherein the pattern image is an image in which a plurality of lines are arranged with white space interposed between the lines.

3. The printing system according to claim 1,
   wherein the correspondence relationship is defined for each type of print medium onto which the pattern image is printed by the target printer and the printing unit; and
   the second unit converts the rendering command into the converted rendering command using information indicating the correspondence relationship based on the type of the print medium.

4. The printing system according to claim 1,
   wherein the pattern image is printed for each slope or curvature factor of the line;
   the correspondence relationship is defined for each slope or curvature factor of the line included in the pattern image; and
   the second unit converts the rendering command into the converted rendering command using information indicating the correspondence relationship based on the slope or curvature factor of the line specified by the rendering command.

5. The printing system according to claim 1,
   wherein the printing unit is configured of a serial printer, and a darkness sensor that measures the desired average darkness and the average darkness is provided in a carriage that includes a print head and moves back and forth in a main scanning direction.

6. A correspondence relationship information creation method for converting a rendering command, the method comprising:
   printing a pattern image by a target printer, the pattern image including a line whose combination of a thickness and a color is a first combination;
   reading the pattern image printed by the target printer using a reading unit provided in a printer;
   printing a pattern image by the printer, the pattern image including a line whose combination is a second combination;
   reading the pattern image printed by the printer using the reading unit; and
   generating information indicating a correspondence relationship between the first combination and the second combination in which a desired average darkness obtained by reading the pattern image printed by the target printer matches an average darkness obtained by reading the pattern image printed by the printer,
   wherein the pattern image printed by the printer indicates a plurality of average darkness values as a combination of each of a plurality of different thickness and colors of a plurality of lines, the pattern image being used to establish a correspondence between the plurality of average darkness values of the printer with a plurality of target average darkness values of a target printer, and wherein the rendering command specifying the first combination is converted into the converted rendering command;
   wherein the pattern image is printed to obtain the plurality of target average darkness values as a combination of a plurality of different target thickness and target colors of a plurality of lines.

* * * * *